(12) United States Patent
Goldstein et al.

(10) Patent No.: US 10,291,733 B2
(45) Date of Patent: *May 14, 2019

(54) COMPUTER SYSTEMS AND METHODS FOR GOVERNING A NETWORK OF DATA PLATFORMS

(71) Applicant: Uptake Technologies, Inc., Chicago, IL (US)

(72) Inventors: Michael Goldstein, Chicago, IL (US); Will Hansmann, River Forest, IL (US); Tom Ravensberg, Denver, CO (US); Jason Kolb, Plainfield, IL (US)

(73) Assignee: Uptake Technologies, Inc., Chicago, IL (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/268,354

(22) Filed: Sep. 16, 2016

(65) Prior Publication Data

US 2017/0085627 A1 Mar. 23, 2017

Related U.S. Application Data

(60) Provisional application No. 62/219,837, filed on Sep. 17, 2015.

(51) Int. Cl.
```
G06F 15/16      (2006.01)
H04L 29/08      (2006.01)
H04L 29/06      (2006.01)
G06F 17/30      (2006.01)
```

(52) U.S. Cl.
CPC ........ *H04L 67/26* (2013.01); *G06F 17/30563* (2013.01); *G06F 17/30575* (2013.01); *H04L 63/10* (2013.01); *H04L 67/10* (2013.01); *H04L 63/102* (2013.01)

(58) Field of Classification Search
CPC .......... G06F 17/30575; H04L 12/2816; H04L 63/10; H04L 63/102; H04L 67/10; H04L 67/26

See application file for complete search history.

(56) References Cited

U.S. PATENT DOCUMENTS

| 5,566,092 A | 10/1996 | Wang et al. |
| 5,633,800 A | 5/1997 | Bankert et al. |

(Continued)

FOREIGN PATENT DOCUMENTS

| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Mohamed A Wasel
(74) *Attorney, Agent, or Firm* — Lee Sullivan Shea & Smith LLP

(57) ABSTRACT

In an environment where a plurality of data platforms are communicatively coupled via a communication network, one platform in the environment may govern whether other platforms in the environment are permitted to participate in the sharing of asset-related information. For example, a first platform may receive, from a second platform (e.g., a master or seed platform) that is communicatively coupled to the first platform via the communication network, criteria that governs whether the first platform is permitted to share asset-related data with one or more other platforms in the network. In turn, the first platform may assess the reliability of the platform's stored asset-related data and then apply the criteria to the assessed reliability to determine whether the first platform is permitted to share asset-related data with the one or more other platforms and then operate in accordance with that determination.

20 Claims, 10 Drawing Sheets

(56) References Cited

U.S. PATENT DOCUMENTS

| | | |
|---|---|---|
| 6,190,313 B1 | 2/2001 | Hinkle |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,688,625 B1 | 4/2014 | Clark et al. |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,403,092 B2 * | 8/2016 | Knutsson ............... A63F 13/12 |
| 2002/0049907 A1 | 4/2002 | Woods et al. |
| 2002/0091972 A1 | 7/2002 | Harris et al. |
| 2002/0152056 A1 | 10/2002 | Herzog et al. |
| 2003/0028268 A1 | 2/2003 | Eryurek et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0193076 A1 | 9/2005 | Flury et al. |
| 2005/0216555 A1 * | 9/2005 | English ............... G06Q 50/18 709/204 |
| 2005/0222747 A1 | 10/2005 | Vhora et al. |
| 2007/0049195 A1 * | 3/2007 | Chun ............... H04B 7/18506 455/3.02 |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0291918 A1 | 11/2008 | Turcot |
| 2009/0181665 A1 * | 7/2009 | Sater ............... H04L 67/36 455/424 |
| 2012/0096156 A1 | 4/2012 | Kvernvik et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0156801 A1 * | 6/2014 | Fernandes ............... H04L 67/26 709/219 |
| 2014/0157436 A1 | 6/2014 | Fujisaki et al. |
| 2014/0164603 A1 * | 6/2014 | Castel ............... H04L 41/04 709/224 |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0161344 A1 * | 6/2015 | Chung ............... G06F 19/3418 705/2 |
| 2015/0262060 A1 | 9/2015 | Husain et al. |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

(56) References Cited

OTHER PUBLICATIONS

Narasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Infor.com (2014).
Infor Equipment, Infor.com (2012).
Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (Draft), NIST (Jan. 2012).
International Search Report for Application No. PCT/US2016/052311, dated Jan. 3, 2017, 3 pages.
International Searching Authority, Written Opinion dated Jan. 3, 2017, issued in connection with International Application No. PCT/US2016/052311, filed on Sep. 16, 2016, 8 pages.
Flowserve. "Asset Performance Management: Assent Optimization." www.flowserve.com/Services-and-Solutions/Asset-Management-and-Optimization/Asset-Data-Management, Oct. 7, 2015 (accessed via Wayback Machine at web.archive.org/web/20151007230518/http://www.flowserve.com/Services-and-Solutions/Asset-Management-and-Optimization/Asset-Data-Management), 3 pages.
Pitney Bowes Business Insight. "Managing Your Data Assets." www.pbinsight.com/files/resource-library/resource-files/ManagingDataAssets.pdf, 2009, 8 pages.
Wikipedia. "Fencing (computing)." en.wikipedia.org/wiki/Fencing_(computing), Oct. 19, 2015 (accessed via Wayback Machine at web.archive.org/web/20151019005113/https://en.wikipedia.org/wiki/Fencing_(computing), 2 pages.
Bottomley, James. "Data Based Fencing." www.usenix.org/legacy/events/usenix04/tech/sigs/full_papers/bottomley/bottomley_html/node27.html, May 12, 2004, 1 page.
Software Engineering Stack Exchange. "How to avoid unauthorized use of an API?" programmers.stackexchange.com/questions/229859/how-to-avoid-unauthorized-use-of-an-api, Feb. 21, 2014, 2 pages.
Wikipedia. "Data Steward." en.wikipedia.org/wiki/Data_steward, Oct. 14, 2015 (accessed via Wayback Machine at web.archive.org/web/20151014080616/https://en.wikipedia.org/wiki/Data_steward), 3 pages.
Metric Insights. "Data Visualization Tools: Push Intelligence Platform." www.metricinsights.com/product/push-intelligence/, Oct. 23, 2015 (accesed via Wayback Machine at web.archive.org/web/20151023083918/http://www.metricinsights.com/product/push-intelligence/), 3 pages.
Aker, Les. "Building Software with Containers." blog.akerl.org/2014/12/20/building-software-with-containers/, Dec. 20, 2014, 4 pages.
Rubens, Paul. CIO: "What are containers and why do you need them?" www.cio.com/article/2924995/enterprise-software/what-are-containers-and-why-do-you-need-them.html, May 20, 2015, 6 pages.
Rouse, Margaret. WhatIs: "What is a golden record?" whatis.techtarget.com/definition/golden-record, May 2013, 4 pages.
Wikipedia. "Apache Hadoop." en.wikipedia.org/wiki/Apache_Hadoop, Sep. 5, 2015 (accessed via Wayback Machine at web.archive.org/web/20150905054512/https://en.wikipedia.org/wiki/Apache_Hadoop), 11 pages.
European Patent Office Extended Search Report for EP Application No. 16847480.7 dated Mar. 19, 2019, 7 pages.

* cited by examiner

COMPUTER SYSTEMS AND METHODS FOR GOVERNING A NETWORK OF DATA PLATFORMS

CROSS REFERENCE TO RELATED APPLICATIONS

This application claims priority to U.S. Provisional Patent Application No. 62/219,837 entitled "Data Aggregation and Normalization Platform" filed Sep. 17, 2015, which is herein incorporated by reference in its entirety. This application also incorporates by reference in its entirety the following application that is being filed on the same day as the present application: U.S. Non-Provisional patent application Ser. No. 15/268,333 entitled "Computer Systems and Methods for Sharing Asset-Related Information Between Data Platforms Over a Network."

BACKGROUND

Machines (referred to herein as "assets") are essential to the modern economy. From locomotives that transfer cargo across countries to farming equipment that harvest crops, assets play an important role in everyday life.

Because of the increasing role that assets play, it is also becoming increasingly desirable to monitor asset-related information. To facilitate this, an organization that is interested in monitoring an asset may deploy a platform that is configured to receive and analyze asset-related information from various sources. In one example, this asset-related information may take the form of data indicting attributes of an asset in operation (e.g., asset operating data such as signal values output by sensors/actuators at the asset, fault codes generated at the asset, etc.). In another example, this asset-related information may take the form of data indicting transactions associated with an asset, such as whether an asset has been sold, rented, or leased during its lifetime. In yet another example, this asset-related information may take the form of data reflecting maintenance and repairs associated with an asset. For instance, such data may indicate that a dealer or repair shop performed certain repairs on the asset or assessed certain asset conditions, such as tire condition, fluid condition, or battery condition. Many other examples are also possible as well.

OVERVIEW

There are numerous organizations that may be interested in receiving and analyzing the type of asset-related information described above, including dealers that sell the assets, manufacturers that manufacture the assets, and owners and/or users of the assets, as examples. In practice, each such organization may wish to deploy its own platform to receive and analyze such asset-related information, which may provide an organization with more freedom and more control over how to use the asset-related information. However, with this arrangement, each organization's platform may only be capable of receiving a subset of asset-related information that is available for analysis. For example, the set of assets from which each different platform may receive operating data may differ (e.g., an asset owner's platform may only be capable of receiving operating data from that owner's particular fleet of assets but not any other owner's assets, while an asset dealer's platform may only be capable of receiving operating data from that dealer's particular fleet of assets but not any other dealer's assets). As another example, each different platform may have access to certain data sources that are not accessible to the other platforms (e.g., an organization may have previously collected and/or generated proprietary asset-related information that is stored at the organization's platform).

This limited access to asset-related information is not desirable, because a platform may perform various tasks that would benefit from a wider range of asset-related information. For example, a platform may be configured to define and execute statistical models related to asset operation, and the accuracy of these models may be dependent on the amount and breadth of the historical data available for training such models. As another example, a platform may be configured to define and execute various workflows related to asset operation (e.g., conditional alerts), and a wider range of asset-related information may enable a platform to improve these workflows (e.g., by optimizing the conditions that trigger such workflows). As yet another example, a platform's user may wish to access a wider range of asset-related information (e.g., in order to make decisions on the maintenance or purchasing of assets). Many other examples are possible as well.

Given these benefits, an organization may be interested in obtaining additional asset-related information from one or more other organizations. For example, if an asset owner's platform is only capable of receiving operating data from the owner's particular fleet of assets, that owner may be interested in obtaining operating data for additional assets from one or more asset dealers and/or asset manufacturers.

Currently, the primary way for an organization to accomplish this is by accessing another organization's platform via an Application Programming Interface (API). However, API data access requires the organization seeking the data to perform an active step of "pulling" that data from the other organization's platform, which is an inefficient mechanism for sharing data. Indeed, this pulling mechanism requires the organization seeking the data to periodically send a request for new data to the other organization, which is inefficient because the requesting organization will have no knowledge of whether new data is even available. Additionally, this pulling mechanism may only enable the requesting organization to access data that has been stored in the other organization's persistent storage, which means that the requesting organization may not have access to data that has been recently ingested by the other organization's platform until the data is persisted. Additionally, this pulling mechanism may require the requesting organization to go through an authentication process that further delays the requesting organization's access to the data. Accordingly, a more efficient approach for sharing data between platforms is desirable.

Disclosed herein are systems and methods that are intended to help address these issues. According to the present disclosure, a plurality of organizations may have respective platforms that are communicatively coupled via a network. In practice, each platform may have a messaging layer that serves to dynamically push new data received by the platform to the appropriate module(s) within the platform, which may in turn serve to provide various services associated with the data. One such module may enable a platform to dynamically push data and/or commands to other platforms in the network.

For instance, a first platform may receive new asset-related data on its messaging layer. Based on that received data, the first platform may determine that given data (e.g., a given portion of the received asset-related data) and/or a given command is to be pushed to a second platform. According to one embodiment, the first platform may make this determination based on a set of rules that dictate which data and/or commands are to be pushed to which platform(s). In response to this determination, the first platform may prepare the given data and/or the given command for transmission to the second platform, establish a network connection with the second platform, and then push the given data and/or the given command over the network connection to the second platform (which may then ingest the given data and/or the given command and proceed accordingly). Advantageously, this event-driven push architecture may enable certain data and/or commands to be exchanged between platforms at near real time, which may overcome certain limitations of the API pull mechanism discussed above.

In accordance with the present disclosure, the platforms may be configured to perform various other functions as well. As one example, each platform may include a data ingestion system that is configured to perform various pre-processing functions on received asset-related data before such data is provided to the platform's messaging layer, such as data mapping, de-duping, and data merging. As another example, each platform may include modules that are configured to provide various other services based on received asset-related data, such as user alerts or predictive analytics. Other examples are possible as well.

In accordance with the present disclosure, there may also be one "master" (or "seed") platform in the network that is configured to govern the other platforms in the network. For example, the "master" platform may govern the whether a new platform can participate in data sharing with other platforms based on factors such as the reliability (or "health") of the new platform's stored data. As another example, the "master" platform may provide other platforms with certain logic (e.g., data models, rules, etc.) that dictates how the platforms perform certain functions, such as the pre-processing of received asset-related data or the triggering of certain actions based on the received asset-related data. The "master" platform may perform other governance functions as well.

Accordingly, in one aspect, disclosed herein are methods to be carried out by a platform in a system comprising a plurality of platforms that are communicatively coupled via a network. One such method may involve (a) receiving, at a first platform, data associated with one or more assets, (b) making a determination, by the first platform, that a given portion of the received data is to be pushed to a second platform, and (c) based on the determination, the first platform (i) preparing the given portion of the received data for transmission to the second platform and (ii) pushing the given portion of the received data to the second platform over a network connection.

Another such method may involve (a) receiving, at a first platform, criteria that governs whether the first platform is permitted to share asset-related data with one or more other platforms in the system, wherein the criteria is based on the reliability of asset-related data stored at a platform (b) the first platform assessing the reliability of asset-related data stored at the first platform (c) the first platform applying the received criteria to the assessed reliability of asset-related data stored at the first platform and thereby making a determination as to whether the first platform is permitted to share asset-related data with one or more other platforms; and (d) the first platform operating in accordance the determination.

In another aspect, disclosed herein are non-transitory computer-readable medium each having instructions stored thereon that are executable to cause a platform to carry out functions disclosed herein.

In yet another aspect, disclosed herein are platforms that each comprise at least one processor, a non-transitory computer-readable medium, and program instructions stored on the non-transitory computer-readable medium that are executable by at least one processor to cause the platform to carry out functions disclosed herein.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
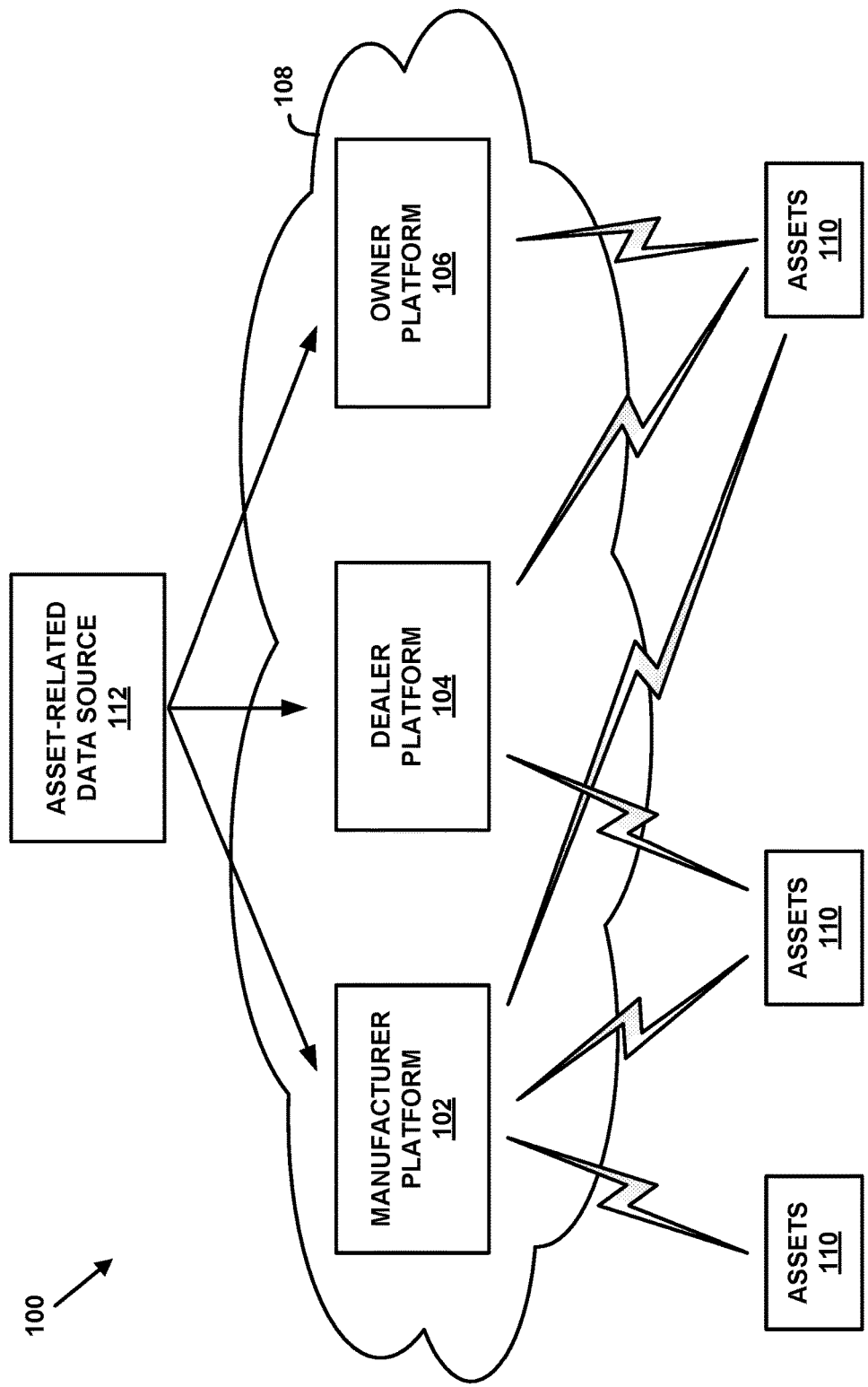
FIG. 1 depicts an example network configuration in which example embodiments may be implemented.

FIG. 1 shows an example network configuration 100 that includes a plurality of platforms coupled via a communication network. For example, as shown, the network configuration 100 may include a manufacturer platform 102 that is associated with a manufacturer of an asset, a dealer platform 104 that is associated with a dealer of the asset, and an owner platform 106 that is associated with an asset owner, and all of which are communicatively coupled together via a communication network 108. This example network configuration is illustrated in context of asset management, and describes the organizations (e.g., manufacturer, dealer, and owner) that might have an interest in accessing information about an asset. However, it should be understood that the concepts disclosed herein may be applied in any other context outside of asset management where parties and other organizations have an interest in sharing data among platforms.

Broadly speaking, each platform 102, 104, 106 may take the form of one or more computer systems that are configured to receive, analyze, and provide access to asset-related data. For instance, a platform may include one or more servers (or the like) having hardware components and software components that are configured to carry out one or more of the functions disclosed herein for receiving, managing, analyzing, and/or sharing asset-related data. Additionally, a platform may include one or more client stations that enable a user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well.

In general, the communication network 108 may include one or more computing systems and network infrastructure configured to facilitate transferring data between the platform 102. The communication network 108 may be or may include one or more Wide-Area Networks (WANs) and/or Local-Area Networks (LANs) and/or wired and/or wireless networks. In some examples, the communication network 108 may include one or more cellular networks and/or the Internet, among other networks. The communication network 104 may operate according to one or more communication protocols, such as LTE, CDMA, WiMax, WiFi, Bluetooth, HTTP, TCP, and the like. Although the communication network 108 is shown as a single network, it should be understood that the communication network 108 may include multiple, distinct networks that are themselves communicatively linked. The communication network 108 could take other forms as well.

As shown in FIG. 1, each platform 102, 104, 106 may be configured to receive data from one or more assets 110. These assets may be of various different types, examples of which may include transportation machines (e.g., locomotives, aircrafts, semi-trailer trucks, ships, etc.), industrial machines (e.g., mining equipment, construction equipment, etc.), medical machines (e.g., medical imaging equipment, surgical equipment, medical monitoring systems, medical laboratory equipment, etc.), and utility machines (e.g., turbines, solar farms, etc.), among other examples. Additionally, the assets of a given type may have various different configurations (e.g., brand, make, model, etc.). Those of ordinary skill in the art will appreciate that these are but a few examples of assets 110 and that numerous other examples are possible and contemplated herein.

In general, each asset 110 may take the form of any device configured to perform one or more operations (which may be defined based on the field) and may also include equipment configured to capture and transmit data indicative of the operation of the asset. This data may take various forms, examples of which may include operating data such as sensor/actuator data and/or abnormal-condition indicators (e.g., fault codes), identifying data for the asset 110, location data for the asset 110, etc. Representative assets are discussed in further detail below with reference to FIG. 2.

As shown, the platforms 102, 104, and 106 may each receive data from a different set of assets 110. For instance, the owner platform 106 may only be configured to receive data from the smaller set of assets 110 that it owns, while the dealer platform 104 may be configured to receive data from a larger set of assets 110 that were provided by the dealer and the manufacturer platform 102 may be configured to receive data from an ever larger set of assets 110 that it manufacturers. However, this is merely just one example that is provided for purposes of illustration. Which platform receives data from which assets 110 may depend on various factors.

While FIG. 1 shows the platforms 102, 104, and 106 receiving data from the one or more assets 110 via the network 108, it should also be understood that the platforms 102, 104, and 106 may receive the data via one or more intermediary systems. For example, an organization may operate a separate system that is configured to receive data from the one or more assets 110, and the organization's platform may then be configured to obtain the data from that separate system. Other examples are possible as well.

As shown in FIG. 1, each platform 102, 104, 106 may further be configured to receive data from an asset-related data source 112 via the network 108. For example, in practice, each platform 102, 104, 106 may receive data from the asset-related data source 112 by "subscribing" to a service provided by the asset-related data source 112. However, the platforms 102, 104, 106 may receive data from the asset-related data source 112 in other manners as well.

In general, the asset-related data source 112 may be or include one or more computer systems that are configured to collect, store, and/or provide data related to the one or more assets 110. For example, similar to what is provided by the one or more assets 110 themselves the data may include data indicative of the operation of the one or more assets 110. Additionally, or alternatively, the data source 112 may be configured to generate and/or obtain data independently from the asset 110, in which case the data may be referred to herein as "external data." Examples of "external" data sources 112 may include environment data sources and asset-management data sources.

In general, environment data sources provide data indicating some characteristic of the environment in which the one or more assets 110 are operated. Examples of environment data sources include weather-data servers, global navigation satellite systems (GNSS) servers, map-data servers, and topography-data servers that provide information regarding natural and artificial features of a given area, among other examples.

In general, asset-management data sources provide data indicating events or statuses of entities that may affect the operation or maintenance of the one or more assets 110 (e.g., when and where an asset 110 may operate or receive maintenance). Examples of data sources include traffic-data servers that provide information regarding air, water, and/or ground traffic, asset schedule servers that provide information regarding expected routes and/or locations of assets 110 on particular dates and/or at particular times, defect detector systems (also known as "hotbox" detectors) that provide information regarding one or more operating conditions of assets that pass in proximity to the defect detector system, part-supplier servers that provide information regarding parts that particular suppliers have in stock and prices thereof, and repair-shop servers that provide information regarding repair shop capacity and the like, among other examples.

An "external" data source 112 may take other forms as well, examples of which may include power-grid servers that provide information regarding electricity consumption and external databases that store historical operating data for assets, among other examples. One of ordinary skill in the art will appreciate that these are but a few examples of data sources and that numerous others are possible.

While FIG. 1 shows that each platform 102, 104, 106 may be configured to receive data from the asset-related data source 112, it should be understood that each platform 102, 104, 106 may have access to a different set of asset-related data provided by the asset-related data source 112. For example, the owner platform 106 may only be provided with data from the data source 112 that relates to the owner's particular fleet of assets, whereas the dealer platform 104 and the manufacturer platform 102 may be provided with data from the data source 112 that relates to a broader set of assets. Alternatively, it may be the case that only certain of the platforms 102, 104, 106 are capable of receiving data from the asset-related data source 112. In practice, which data provided by the asset-related data source 112 is accessible by which platform may depend on various factors.

Further, while FIG. 1 shows the platforms 102, 104, and 106 receiving data from the asset-related data source 112 via the network 108, it should also be understood that the platforms 102, 104, and 106 may receive the data via one or more intermediary systems. For example, an organization may operate a separate system that is configured to receive data from asset-related data source 112, and the organization's platform may then be configured to obtain the data from that separate system. Other examples are possible as well.

Further yet, it should be understood that a given organization's platform may interface with one or more organization-specific data sources such as an organization's pre-existing platform (not shown), and asset-related information obtained from such an organization-specific data source may then initially be available only to the given organization's platform.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
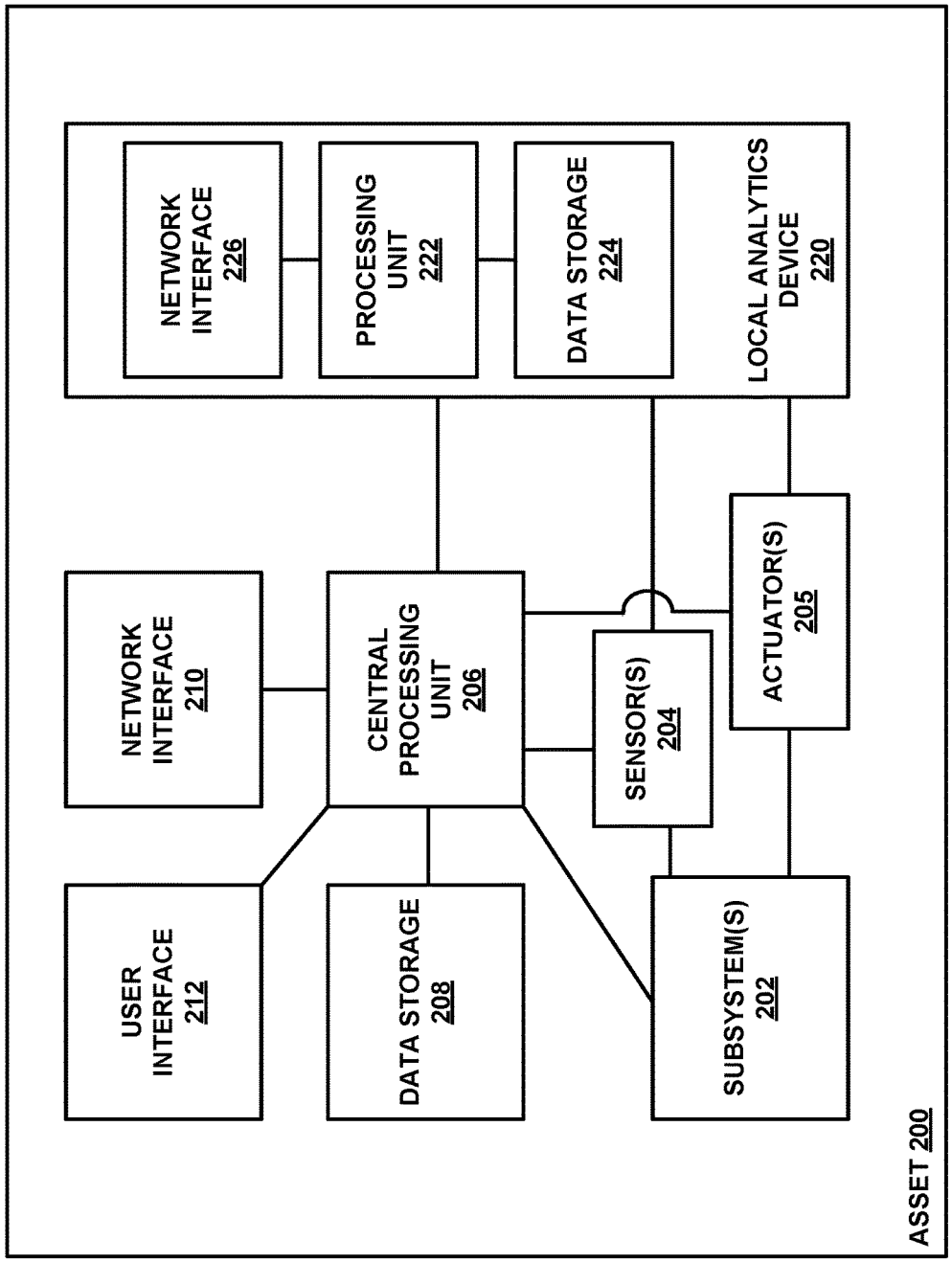
FIG. 2 depicts a simplified architecture of an example asset.

Turning to FIG. 2, a simplified block diagram illustrating some of the components that may be included in an example asset 200 is depicted. Any of the assets 110 from FIG. 1 may have a configuration similar to that of example asset 200. As shown, the asset 200 may include one or more subsystems 202, one or more sensors 204, one or more actuators 205, a central processing unit 206, data storage 224, a network interface 210, a user interface 212, and a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems.

For instance, in the context of transportation assets, examples of subsystems 202 may include engines, transmissions, drivetrains, fuel systems, battery systems, exhaust systems, braking systems, electrical systems, signal processing systems, generators, gear boxes, rotors, and hydraulic systems, among numerous other subsystems. In the context of a medical machine, examples of subsystems 202 may include scanning systems, motors, coil and/or magnet systems, signal processing systems, rotors, and electrical systems, among numerous other subsystems.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like.

Additionally, various sensors 204 may be configured to measure other operating conditions of the asset 200, examples of which may include temperatures, pressures, speeds, acceleration or deceleration rates, friction, power usages, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 110 may be or include one or more non-transitory computer-readable storage media, such as optical, magnetic, organic, or flash memory, among other examples.

The central processing unit 206 may be configured to store, access, and execute computer-readable program instructions stored in the data storage 224 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 224.

The central processing unit 206 may also be configured to determine whether received sensor and/or actuator signals trigger any abnormal-condition indicators, such as fault codes. For instance, the central processing unit 206 may be configured to store in the data storage 224 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the analytics system 220.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the analytics system 108 and/or cause the asset's user interface 212 to output an indication of the abnormal condition, such as a visual and/or audible alert. Additionally, the central processing unit 206 may log the occurrence of the abnormal-condition indicator being triggered in the data storage 110, perhaps with a timestamp.

Figure 3:
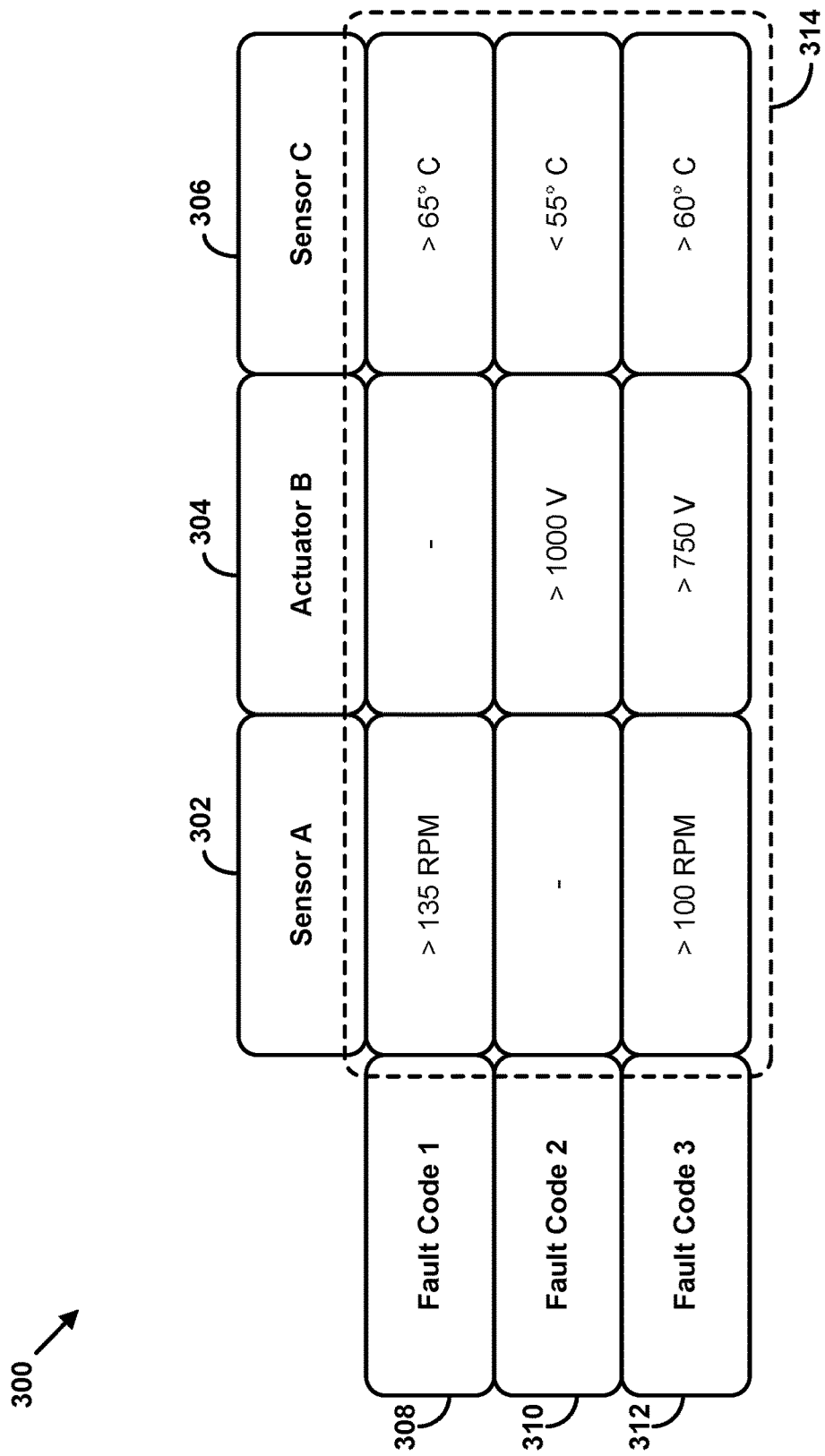
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, and/or the user interfaces 212 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 110. Other functionalities of the central processing unit 206 are discussed below.

The network interface 210 may be configured to provide for communication between the asset 200 and various network components connected to communication network 106. For example, the network interface 210 may be configured to facilitate wireless communications to and from the communication network 106 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The local analytics device 220 may generally be configured to receive and analyze data related to the asset 200 and based on such analysis, may cause one or more operations to occur at the asset 200. For instance, the local analytics device 220 may receive operating data for the asset 200 (e.g., data generated by the sensors 204 and/or actuators 205) and based on such data, may provide instructions to the central processing unit 206, the sensors 204, and/or the actuators 205 that cause the asset 200 to perform an operation.

To facilitate this operation, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive operating data from the central processing unit 206 (e.g., operating data that is generated by sensors 204 and/or actuators 205 and sent to the central processing unit 206) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related a predictive model. For example, the local analytics device 220 may receive data from a remote source, such as the analytics system 108 or the output system 110, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model-workflow pair based on such signals. Other functions are described below.

The network interface 226 may be the same or similar to the network interfaces described above. In practice, the network interface 226 may facilitate communication between the local analytics device 220 and the analytics system 108.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 220. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207 , which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

An example platform will now be described with reference to FIGS. 4-5. Any of the platforms 102, 104, 106 from FIG. 1 may have a configuration similar to that of this example platform.

Figure 4:
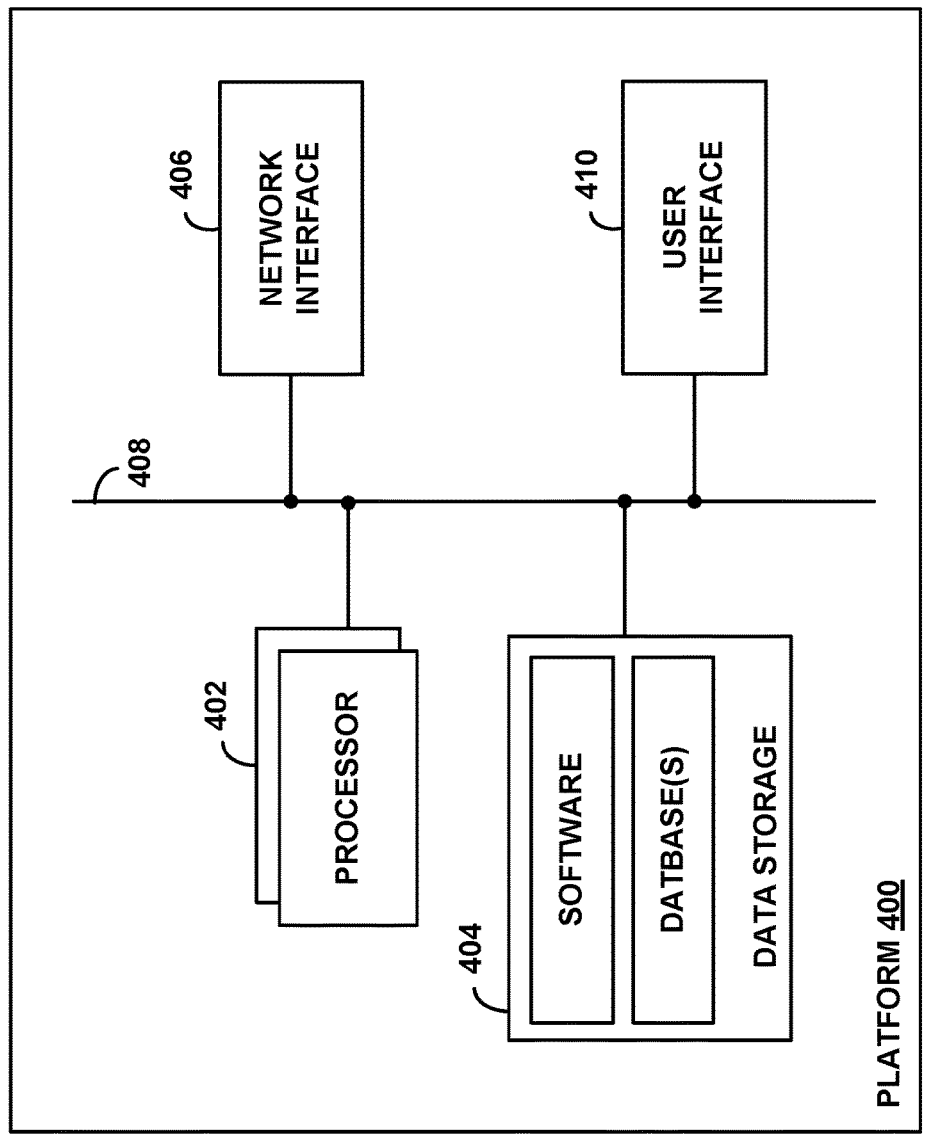
FIG. 4 is a structural block diagram of an example platform.

FIG. 4 is a simplified block diagram illustrating some components that may be included in an example platform 400 from a structural perspective. As noted above, a platform may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components coupled to the communication network 108, such as the asset 110 and the asset-related data source 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 402 may also include multiple network interfaces that support various different types of network connections, some examples of which may include Hadoop, FTP, relational databases, high frequency data such as OSI PI, batch data such as XML, and Base64. Other configurations are possible as well.

In some embodiments, the example platform 400 may support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well.

In other embodiments, the user interface 410 may take the form of a client station. The client station may be communicatively coupled to the example platform via a communication network and the platform's network interface. Other configurations are possible as well.

Figure 5:
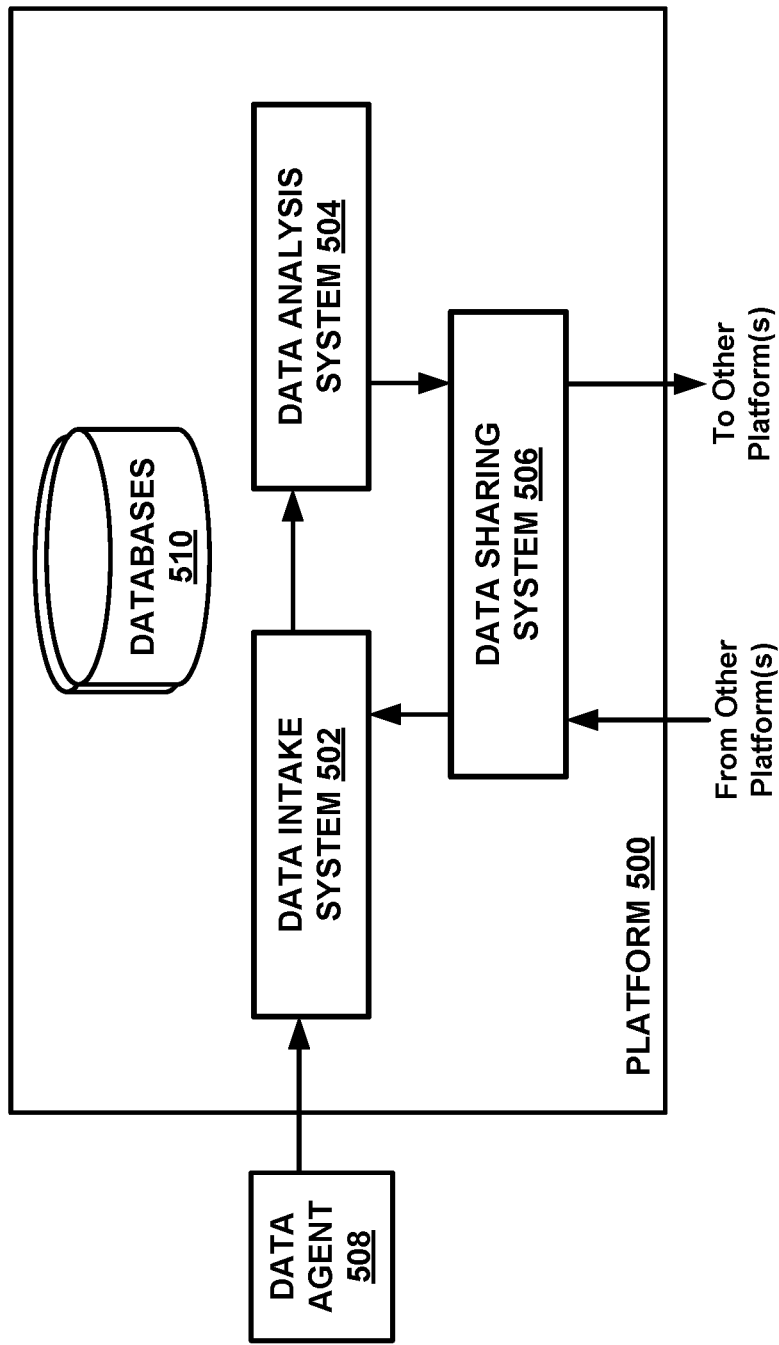
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502, a data analysis system 504, a data sharing system 506, each of which comprises a combination of hardware and software that is configured to carry out particular functions. The platform 500 may also include a plurality of databases 510 that are included within and/or otherwise coupled to one or more of the data intake system 502, data analysis system 504 and data sharing system 506. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing infrastructure. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an asset-related data source, or an organization's existing infrastructure), that source may be provisioned with a data agent 508. In general, the data agent 508 may be a software component that functions to access asset-related data at the given source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given source may be capable of accessing, formatting, and/or transmitting asset-related data to the example platform 500 without the assistance of a data agent.

The asset-related data received by the data intake system 502 may take various forms. As one example, the asset-related data may include operating data for an asset such as, for example, one or more sensor measurements, one or more actuator measurements, or one or more abnormal-condition indicators. As another example, the asset-related data may include external data about an asset such as, for example, asset inventory rental information, warranty information, or maintenance information. As yet another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data may take other forms as well.

The data intake system 502 may also be configured to perform various pre-processing functions on the received asset-related data, in an effort to provide data to the data analysis system 504 that is clean, up to date, consistent, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 510 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 510 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 510 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

The data analysis system 504 may generally function to receive asset-related data from the data intake system 502, analyze that data, and then take various actions based on that data. These actions may take various forms.

As one example, based on the received asset-related data, the data analysis system 504 may provide various types of notifications, such as web notifications, email notifications, or the like. These notifications may be related to the operation of assets, the operation of the platform, or other related subjects that are of interest to a user.

As another example, based on the received asset-related data, the data analysis system 504 may train and/or execute a data science model (e.g., a predictive model), which may be implemented in a data science engine. For more detail regarding predictive models related to asset operation, please refer to U.S. application Ser. No. 14/732,258, which is incorporated by reference herein in its entirety. The data analysis system 504 may perform other types of data analytics based on the received asset-related data as well.

As yet another example, based on the received asset-related data, the data analysis system 504 may cause the platform 500 to dynamically push data and/or commands to other platforms in the network. For instance, based on the received data, the data analysis system 504 may determine that certain data (e.g., a portion of the received asset-related data) and/or a certain command is to be pushed to another platform and then responsively push the data and/or the command to the data sharing system 506, which may handle the transmission of the data and/or the command to the other platform.

As still another example, based on the received asset-related data, the data analysis system 504 may make certain data available for external access via an API. The data analysis system 504 may take various other actions based on the received asset-related data as well.

According to an embodiment, the received asset-related data may be passed through the data analysis system 504 via a messaging layer (sometimes referred to as a "Universal Data Bus"), which may provide for event-driven, push communication between the different modules of the data analysis system 504. This messaging layer may be configured according to various technologies, one example of which is Apache Kafka. Further, the data analysis system 504 may analyze the received asset-related data to determine which actions to take based on a set of rules that correlate certain data received by the platform 500 with certain actions to be taken by the platform 500. These rules are described in further detail below.

In addition to analyzing the received asset-related data for taking potential actions based on such data, the data analysis system 504 may also be configured to store the received data into one or more of the databases 510. For example, the data analysis system 504 may store the received data into a given database that serves as the primary database for providing asset-related data to platform users as well as other platforms.

In some embodiments, the data analysis system 504 may also support a software development kit (SDK) for building, customizing, and adding additional functionality to the platform. Such an SDK may enable customization of the platform's functionality on top of the platform's hardcoded functionality.

As shown, the data ingestion system 502 and the data intake system 504 may both be communicatively coupled to the data sharing system 506. The data sharing system's interface with the data ingestion system 502 and the data analysis system 504 may take various forms. For instance, the data sharing system 506 may be communicatively coupled to the data ingestion system 502 and/or the data analysis system 504 via an API. Other interface technologies are possible as well.

The data sharing system 506 may generally function to facilitate communication between the example platform 500 and other platforms via a communication network. For instance, as noted above, the data analysis platform 504 may provide the data sharing platform 506 with data and/or a command (e.g., for a CRUD action) to be pushed to another platform. In turn, the data sharing platform 506 may function to prepare the data and/or the command for transmission to the other platform (e.g., by creating a routing command, performing data scrubbing, etc.), establish a network connection with the other platform (e.g., a TCP or HTTP connection), and then push the data and/or the command over the network connection to the other platform.

Correspondingly, the data sharing platform 506 may function to receive, validate, and route data and/or commands that have been pushed from another platform via a communication network. For example, if the data sharing platform 506 receives data pushed from another platform, the data sharing platform 506 may function to perform certain validation and pre-processing functions on the received data and/or commands and then push the data and/or commands to the data ingestion platform 502. In turn, the data ingestion platform 502 may perform one or more of the pre-processing functions described above and then communicate the data and/or the commands to the data analysis system 504, which may act accordingly. The data sharing platform 506 may perform other functions to facilitate communication with other platforms as well.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

The configurations depicted in FIGS. 1 to 5 will now be discussed in further detail below. To help describe some of these operations, functional block diagrams may be referenced to describe operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where the one or more assets 110 and/or the asset-related data source 112 provide asset-related data to the platform and the asset-related data is then pushed to another platform via the communication network 108. It should be understood that this is done merely for sake of clarity and explanation and is not meant to be limiting. In practice, the platform generally receives data from multiple sources, perhaps simultaneously, and performs operations based on such aggregate received data.

A. Platform Deployment and Governance

In order to enable data sharing between a plurality of platforms, these platforms first need to be deployed, networked together, and configured (e.g., onboarded). In accordance with the present disclosure, one platform in the network may be designated as a "master" or "seed" platform that may govern how certain of these administrative functions are carried out at other platforms in the network.

In one aspect, the master platform may dictate whether a new platform is allowed participate in data sharing with other platforms. This may be based on various factors. For instance, in a preferred embodiment, the master platform may dictate that a new platform's ability to participate in data sharing is based on the reliability (or "health") of the new platform's stored data. According to this embodiment, the master platform may define a set of one or more reliability conditions that the new platform needs to meet in order to participate in data sharing. This set of reliability conditions may be sent from the master platform to the new platform via the communication network 108, or may be provided to the new platform in some other manner. Further, this set of reliability conditions may take various forms. According to one example, the set of reliability conditions may impose a requirement on how much of a new platform's stored data must be successfully mapped to the new data model during the initial data ingestion. According to another example, the set of reliability conditions may impose requirements related to which data fields should be present in the data being passed into the data analysis system 504. The set of reliability conditions may take other forms as well.

During the onboarding process, the new platform may then assess the reliability (or "health") of the new platform's stored data. The new platform may perform this function in various manners. According to one example, the new platform may assess the reliability of the platform's stored data by determining what proportion of the stored data was successfully mapped to the new data model during the initial data ingestion. According to another example, the new platform may assess the reliability of the platform's stored data by checking whether certain preferred data fields are present in the data being passed into the data analysis system 504 and then determining what proportion of this data includes the preferred data fields. The new platform may assess the reliability of the platform's stored data in various other manners as well.

After assessing the reliability of the stored data, the new platform may then apply the set of reliability conditions defined by the master platform, to determine whether or not the reliability of the new platform's stored data is sufficient. If the new platform determines that the master platform's set of reliability conditions has been met, the new platform may enable (i.e., "turn on") its data sharing capability so that it can exchange asset-related data and/or commands with other platforms. Alternatively, if the new platform determines that the master platform's set of reliability conditions has not been met, the new platform may disable (i.e., "turn off") its data sharing capability entirely or may impose certain restrictions this capability. For example, the new platform could disable its capability to send data and/or commands to other platforms but continue to allow the new platform to receive data and/or commands from other platforms. As another example, the new platform could impose restrictions on the type of data and/or commands that it is allowed to exchange with other platforms. The new platform may restrict its data sharing capabilities in other manners as well.

After determining whether or not to enable its data sharing capabilities, the new platform may also send a notification of this determination to the master platform and/or other platforms in the network. In turn, another platform in the network may later rely on this notification when deciding whether or not to share asset-related data with the new platform.

The master platform may also be capable of defining and sending updated conditions for allowing data sharing, which may cause the other platforms to repeat the process described above. Likewise, a platform may be configured to periodically reassess the reliability of its stored data and update its data sharing capabilities as appropriate.

In another aspect, the master platform may define and/or provide other platforms with other logic (e.g., data models, rules, etc.) that dictates how the other platforms perform certain functions. For instance, according to one embodiment, the master platform may be responsible for defining and distributing one or more data models (or aspects thereof) for use by the other platforms when ingesting and mapping data received from asset-related sources.

According to another embodiment, the master platform may be responsible for defining and distributing logic that dictates how the other platforms perform certain other pre-processing functions. For instance, the master platform may define and distribute logic related to data mapping, data cleansing, de-duplication, data merging, action identification, and/or data splitting, among other pre-processing functions. As one possible example, the master platform may define and distribute routing and/or transformation rules to be used during the data mapping process. Many other examples are possible as well.

According to yet another embodiment, the master platform may be responsible for defining and distributing logic that dictates the actions to be taken by other platforms based on received data. For instance, the master platform may define and distribute certain predefined rules, workflows, predictive models, or the like. As one possible example, the master platform may define and distribute source-to-target rules that dictate how to route certain types of asset-related data within the platform. Other examples are possible as well.

The master platform may distribute data sharing conditions and/or other logic to the other platforms in various manners. According to one example, the master platform may send data sharing conditions and/or other logic to the other platforms via the communication network 108. According to another example, the master platform may upload data sharing conditions and/or other logic to a common database that is accessible by the other platforms. Other examples are possible as well.

In connection with this functionality, the master platform may also provide a tool (which may be referred to as a "Data Steward" tool) through which a user of a master platform may define how other platforms are to be governed. As one possible example, this tool may take the form of a graphical user interface (GUI) that may be accessed by the user via a client station on communication network 108. Using this tool, a user may input data sharing conditions and/or other logic that is to be employed by other platforms (as examples), and the master platform may then cause the data sharing conditions and/or other logic to be distributed to the other platforms.

The master platform may perform other functions as well in addition to or instead of what is described.

B. Data Intake of the Asset-Related Information

Figure 6:
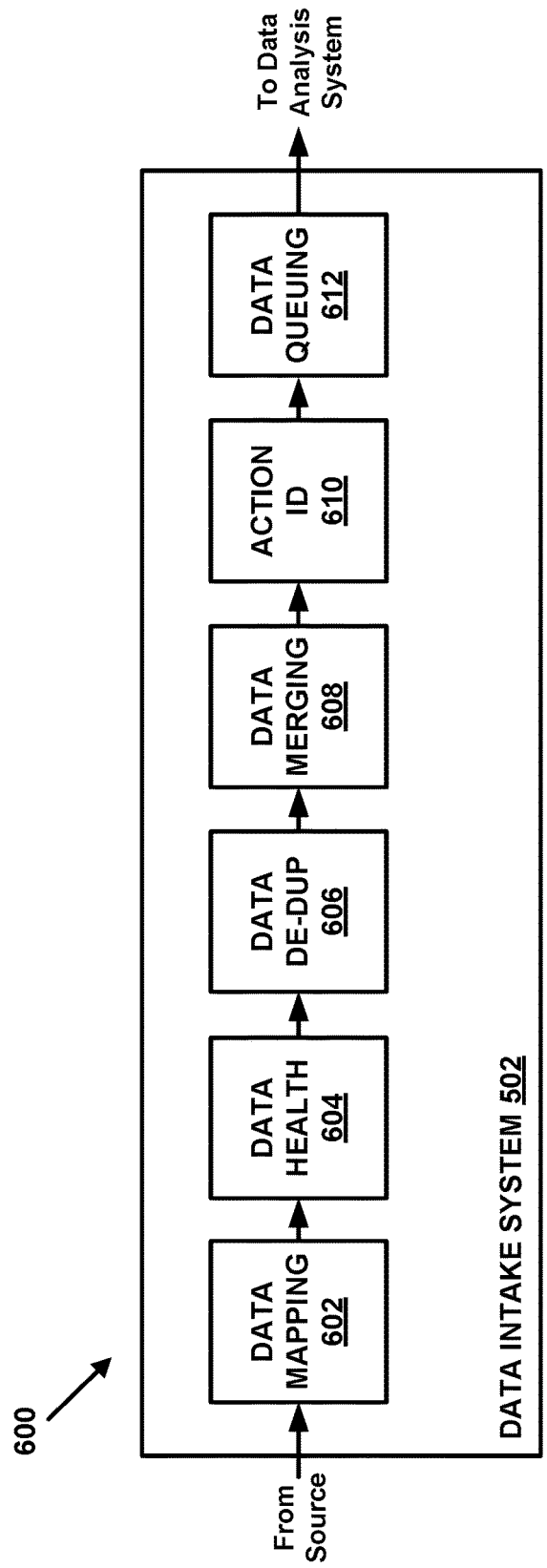
FIG. 6 is a functional block diagram that illustrates example data intake system functions performed by the example platform.

FIG. 6 is a functional block diagram 600 that illustrates some representative functions that may be carried out by the data intake system 502 after it receives asset-related data from a source, such as an asset, an asset-related data source, or the like. As shown in FIG. 6, these functions may include data mapping 602, data health evaluation 604, data de-duplication 606, data merging 608, action identification 610, and data queuing 612. The data intake system 502 may support NiFi or some other data flow technology to send, receive route the data, as needed, among the functional blocks. Other arrangements are also possible.

While FIG. 6 shows these functions taking place in a given sequence, it should be understood that this sequence is merely provided for purposes of illustration, and that the illustrated functions may be performed in various other sequences as well (including the possibility that certain functions may be performed in parallel). Further, it should be understood that some of these functions may be skipped and/or that functions may be added to the process flow.

The mapping function 602 may generally serve to map the received asset-related data into one or more data models for use by the platform 500. The data received from a given source such as an asset 110 or an asset-related data source 112 may be in a particular format. The particular format may be a standard or generic format, a format specific to an asset 110 or type of asset 110, a format specific to the asset related data source 112, a format specific to the platform where the data is received from, or a format specific to a manufacturer, dealer, or owner, for example. The mapping function 602 may then convert the format of the asset-related data to a format for use by the platform 500, which may involve storing received asset-related data fields into the appropriate fields of the data model and transforming the contents of certain asset-related data fields. These function may be performed in accordance with routing and/or transformation mapping rules, which may be supplied by the platform provider, defined by the platform (e.g., based on user input or machine learning), and/or received from another platform.

In general, a data model may be a defined data structure that dictates the manner in which certain data should be organized and/or formatted, thereby enabling the platform to manage data coming from various different sources. According to one embodiment, a data model may define a data structure comprising a plurality of data fields that each have specified parameters, such as a specified namespace, a specified data type, a specified unit of measure, and/or specified data value constraints, as examples. These data fields may be configured to accept asset-identifying data as well as various data related to asset operation, such as sensor/actuator data, on-asset event data (e.g., abnormal-condition indicators), location data, inspection/maintenance/repair data, fluid data, weather data, job site data, configuration data, and transaction data, among many other examples. A data model may take other forms as well. In addition, the particular data model used by the mapping function 602 could vary depending on the source of the data (e.g., there may be different data models for different types of assets and/or different types of external data sources).

The data model used by the mapping function 602 may be defined in various manners. In one example, aspects of the data model may be predefined by the platform provider. In another example, as noted above, aspects of the data model may be defined by the master or seed platform. In yet another example, aspects of the data model may be defined by the platform 500 (e.g., based on user input or machine learning). A data model could be defined in other manners as well.

The mapping function 602 may additionally discard certain received asset-related data fields that cannot be mapped to a field of the data model, such as a received data field that is not sufficiently labeled, does not match the data managed by the data model, does not fall within a range of values defined by a field in the model, or is otherwise identified to be corrupt, incorrect, incomplete, duplicative, or improperly formatted. This function, which may be referred to as "data cleansing," may help improve the integrity of the asset-related data that is ingested into the platform 500. It should be understood that other processes within the data ingestion system 502 may also perform data cleansing functions.

In connection with the mapping function 602, a platform may also provide a tool (which may be referred to as a "Data Mapping" tool) through which a user of the platform may define aspects of the one or more data models and/or mapping rules used by the mapping function 602. As one possible example, this tool may take the form of a GUI that may be accessed by the user via a client station on communication network 108. Using this Data Mapping tool, a user of a given platform may input instructions on how to map certain source data fields to the one or more data models used by the mapping function 602, and these instructions may then be employed by the given platform's mapping function 602. Additionally, depending on the role of the given platform within the network configuration, user input received via this Data Mapping tool may also be distributed to and/or used by other platforms. For example, if the given platform is the master platform, user input received via the Data Mapping tool may be distributed for use by all other platforms in the network configuration. Other examples are possible as well.

The data health evaluation function 604 may generally serve to assess the reliability (or "health") of the received asset-related data and potentially discard any unreliable data. For example, the data intake system 502 may have criteria that it may use in assessing the reliability of the received data. As one possible example, the data health evaluation function 604 may assess the reliability of the received asset-related data by determining what proportion of the received asset-related data was successfully mapped to a data model during the mapping function 602. As another example, the data health evaluation function 604 may assess the reliability of the received asset-related data by checking whether certain preferred data fields are present in the data being passed to the data analysis system 504 and then determining what proportion of this data includes the preferred data fields. The data health evaluation function 604 may assess the reliability of received asset-related data in various other manners as well.

The de-duplication function 606 may generally serve to determine whether the received data is stored already, e.g., duplicated in one of the databases 510, and if so, whether to update or delete the data in the database and replace with the received data. This process may be performed for all received data or when the metadata associated with data indicates that de-duplication is to be performed. For example, the data intake system 502 may check a setting as indicated by the metadata associated with the data, if this de-duplication is to be performed.

Hashing may be one way for determining whether duplicates exist. Hashing can be a process of transforming of a string of characters into a usually shorter fixed-length value or key that represents the original string. In one example, a hashing function may be applied to the data generate a unique signature that identifies the data, called a hash.

The hashing function may be applied to the data received and the data in the model. Then the hash of the data received is compared to hashes representing the data in the model. The hash of the data in the model may be performed each time the data is accessed from the model or once a hash is performed on the data in the model, the hash may be also stored in the model for later use. If there is a match, then the data that is received may not be stored in the model because the hash indicates the data is already in the model. If there is no match, then the data received may be stored in the model.

The data merging function 608 may generally serve to determine whether received data is related to data already stored in one of the databases 510 (e.g., a different version of the same data) and then merge any such received data together with the stored data. For example, if the data ingestion system 502 receives new asset-related data for a given asset that includes certain fields that are more complete or up-to-date than the stored asset-related data for the given asset, the data ingestion system 502 may merge the new data with the stored data. As another example, if the data ingestion system 502 receives data records for the same given asset from multiple different sources, the data ingestion system 502 may combine the data records into a single, authoritative for the given asset. Other examples are possible as well.

The de-duplication function 606 and/or the data merging function 608 may sometimes be referred to as "Master Data Management" (or "MDM"). In connection with these MDM functions, the platform 500 may also provide a tool through which a user of the platform 500 may define rules for performing certain de-duplication and/or merging functions, such as rules specifying the similarity requirements for data merging and/or rules specifying which data record should be treated as more authoritative during de-duplication and/or merging functions. As one possible example, this tool may take the form of a GUI that may be accessed by the user via a client station on communication network 108.

The action identification function 610 may generally serve to identify what actions should be taken based on the received data and then place the data into a form that serves to notify the data analysis system 504 of the identified actions. For instance, the action identification function 610 may analyze the data received by the data ingestion system 502 to determine whether it comprises, includes, and/or is associated with a command specifying an action to take based on the data (e.g., a CRUD action). In turn, the action identification function 610 may place the data into a form that will serve to notify the data analysis system 504 of the identified action, such as a particular API call. The action identification function 610 may notify the data analysis system 504 of the identified actions in other manners as well.

The data queuing function 612 may generally serve to split the data into different data categories. For example, the data ingestion system 502 may segregate the received data into different queues that correspond to different categories, which may facilitate specific processing based on the categories by the data analysis system 504 (which receives the data from the data intake system 502). For instance, the data intake system 502 may employ a first queue for sensor/actuator data (e.g., a fuel level), a second queue for event data (e.g., an abnormal-condition indicator), and a third queue for asset status information (e.g., location). Other arrangements are also possible depending on a level of desired granularity.

As noted above, the data intake system 502 may other perform other functions in addition to those illustrated in FIG. 6. For instance, the data intake system 502 may also store the received asset-related data in one or more of the databases 510 for subsequent access or archival purposes. In one example, the data may be stored with a time stamp indicating a date and time at which the data was added to the database. The data may be stored in a number of manners in the database. For instance, data may be stored in time sequence, organized based on data source type (e.g., based on asset, asset type, sensor, or sensor type), or organized by abnormal-fault indicator, among other examples.

C. Data Analysis of the Asset-Related Information

Figure 7:
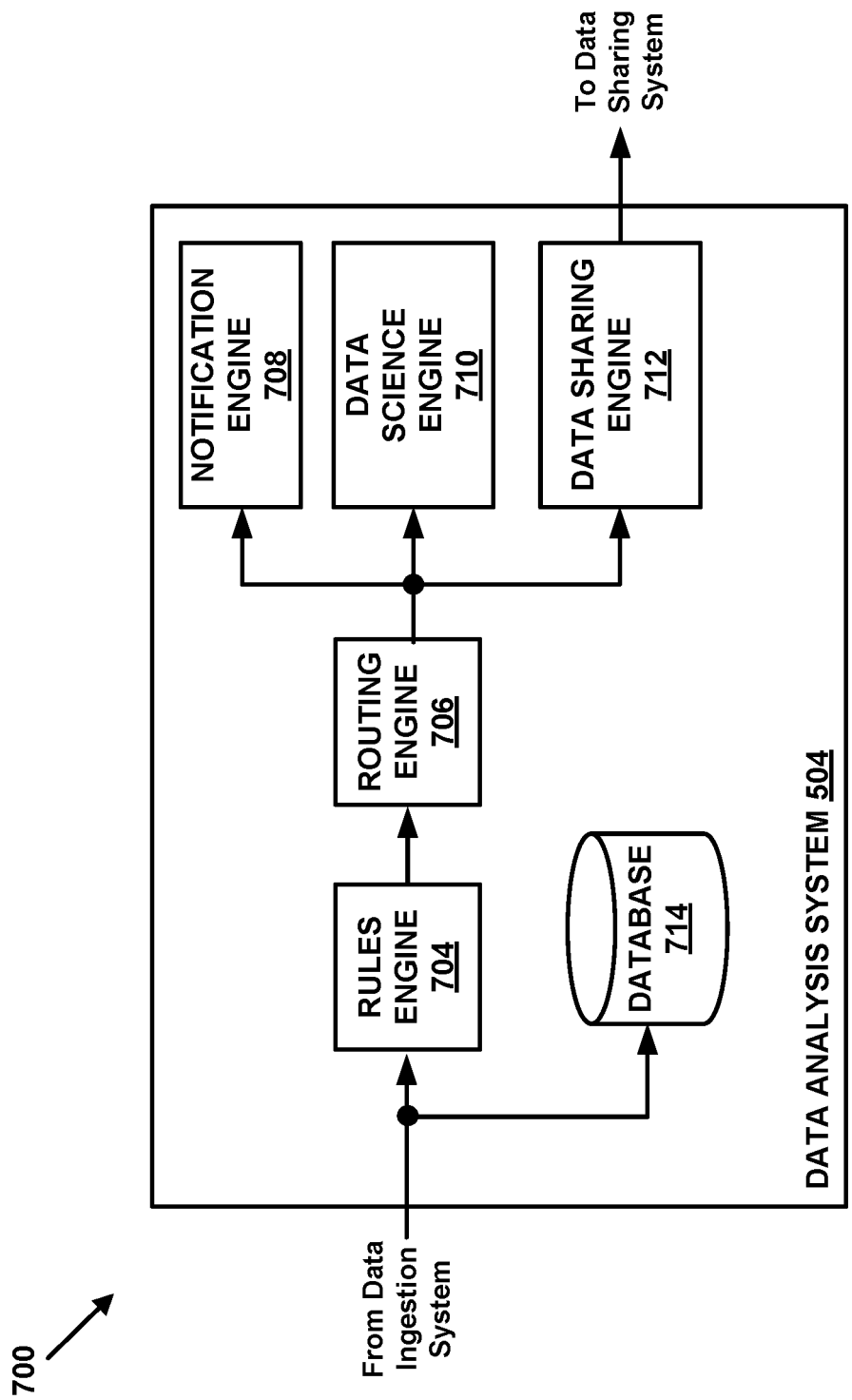
FIG. 7 is a functional block diagram that illustrates example data analysis system functions performed by the example platform.

FIG. 7 is a functional block diagram 700 that illustrates some representative functions that may be carried out by the data analysis system 504 after it receives asset-related data from the data intake system 502. As show in FIG. 7, the data analysis system 504 may include a rules engine 704, a routing engine 706, a notification engine 708, a data science engine 710, and a data sharing engine 712, all of which may be interconnected by a messaging layer (e.g., a Kafka messaging layer) that pushes data between these functional blocks. In addition, the data analysis system 504 may include and/or be coupled to at least one of the databases 510, which is shown here as database 714. The data analysis system 504 may include other functional components as well.

The data analysis system 504 may first receive the asset-related information from the data intake system 502 via an interface such as an API. In response, the data analysis system 504 may place the received data on the messaging layer while at the same time storing a copy of the received data in the database 714, which may serve as the platform's primary database for providing asset-related data to platform users and other platforms. As noted above, the data analysis system's messaging layer may provide for event-driven, push communication between the different engines of the data analysis system 504. In practice, the messaging layer may be comprised of various different topics (not shown) that facilitate this event-driven, push communication. For example, the messaging layer may include a plurality of intake topics, each of which is associated with a respective data category and corresponds to a respective queue in the data intake system 502, in which case the data analysis system 504 may place the received data on the messaging layer by writing the received data to the appropriate intake topic. The messaging layer may then route the received data to the rules engine 704.

In turn, the rules engine 704 may determine what the data analysis system 504 should do with the asset-related data received from the data intake system 502. The determination may take various forms. As one example, based on the asset-related information, the rules engine 704 may determine that the data analysis system 504 should provide various types of notifications, such as web alerts and email notifications, or the like. These notifications may be related to the operation of assets, the operation of the platform, or other related subjects that are of interest to a user. As another example, based on the received asset-related data, the rules engine 704 may determine that the asset-related information should be provided to a data science engine. As still another example, the rules engine 704 may determine that certain data should be made available for external access via an API. As yet another example, the rules engine 704 may determine that certain data (e.g., a portion of the received asset-related data) and/or a certain command should be pushed to another platform via the communication network 108. As still another example, the rules engine 704 may determine that the asset-related information should be routed to and stored in certain databases in the platform 500.

The rules engine 704 may make the determination of what the data analysis system 504 should do with the asset-related data based on a set of rules. In one embodiment, these rules may be configured into two tiers. In general, the first tier rules may cause the rules engine 704 to make a threshold determination of whether the received data has any possible relevance to the other engines of the data analysis system 504, and if not, to discard such data. As such, a first tier rule may generally take the form of a set conditions that define the data to be kept by the rules engine 704. These conditions may be directed to source, type, and/or content of the data, as examples. This may allow the data analysis system 504 to efficiently narrow down the set of data that needs to undergo further analysis.

In turn, the second tier rules may enable the rules engine 704 to determine what action(s) to take based on the remaining data. A second tier rule may generally comprise (1) a set of one or more conditions related to the source, type, and/or content of the received data (among other factors) and (2) a corresponding action to be carried out by the platform when this set of conditions are met. These conditions and corresponding actions may take many different forms.

For instance, one category of second tier rules may be directed to generating notifications based on the received data. A representative example of this category of rule may specify that a given user notification is to be generated when operating data for an asset meets certain content conditions (e.g., when sensor data values meets certain thresholds or certain abnormal-condition indicators have been received).

Another category of second tier rules may be directed to running data science models on the received data. A representative example of this category of rule may specify that certain types of asset operating data are to be input into a data science engine that is configured to apply a given data science model (e.g., sensor data and/or abnormal-condition indicators for an asset are to be input into predictive failure model).

Yet another category of second tier rules may be directed to pushing certain data (and/or related commands) to other platforms in the network configuration. A representative example of this category of rule may specify that asset operating data from a certain source, having a certain type, and/or meeting certain content conditions is to be pushed to a specific list of one or more other platforms in the network configuration (which may be referred to as an "access list"). For instance, one real world illustration of this type of rule may specify that, when a dealer's platform receives data related to the operation of certain asset models, the dealer's platform is to push such data to the manufacturer of those asset models. Another representative example of this category of rule may specify that the output of a certain data science model is to be pushed to a specific list of one or more other platforms in the network configuration. (In this respect, the output of the data science model could be fed back to the rules engine 704 via the messaging layer, or there could be another instance of a rules engine implemented at the output of the data science model). Other examples are possible as well.

In some examples, the rules employed by the rules engine 704 may also be organized by data type. For example, the rules engine 704 may have different sets of rules that correspond to the different intake topics of the messaging layer, so that the data analysis system 504 can more efficiently process the data by applying a specific set of rules directly relevant to the data in the topic and not apply rules that are unrelated to the data in the topic. The rules employed by the rules engine 704 may take various other forms as well.

Further, the rules employed by the rules engine 704 may be defined in various manners. In one implementation, the rules may be defined by a user of the platform. For example, the platform may provide a tool (which may be referred to as a "Data Fencing" tool) through which a user can create, modify, and/or delete rules used by the rules engine 704. As one possible example, this tool may take the form of a GUI that may be accessed by the user via a client station on communication network 108. Using this tool, a user may input rules such as those described above.

In another implementation, certain rules could be received from another platform, such as a master platform. For instance, a manufacturer may release a new product such as a new model of locomotive that may need to be managed by the platform. In connection with this product release, the master platform may define a new rule related to the type and/or content of the data received from the new locomotive model, and may then provide access to this rule to the other platforms.

In yet another implementation, certain rules could be predefined by the platform provider. The rules may be defined in other manners as well.

It should also be understood that certain rules may be based on factors other than the source, type, and/or content of the received data. For example, a rule directed to pushing certain received data (and/or related commands) to another platform in the network configuration may also include conditions related to the recipient platform, such as conditions related to whether or not the recipient platform is qualified to participate in data sharing.

As a result of applying the rules, the rules engine 704 may generate an indication of what action should be performed based on the received data. In one example, this indication may take the form of metadata that is added to or otherwise associated with the received data (e.g., in a header field). In another example, this indication may take the form of a separate command that is not associated with any underlying data. Other examples are possible as well.

Depending on the type of action, this indication of what action should be performed may take various forms and include various information. For example, if the action is to generate a given notification, the indication may specify the type of notification, the content of the notification, and/or the intended recipient(s) of the notification. As another example, if the action is to apply a data science model to received data, the indication may specify the data science model that is to be applied the data. As yet another example, if the action is to push received data to one or more other platforms, the indication may specify the one or more other platforms that are to receive the data. The indication of what action should be performed may take various other forms as well.

The messaging layer may push the output of the rules engine 704 to the routing engine 706. In practice, this may be carried out by a message layer topic that sits between the rules engine 704 to the routing engine 706. In turn, the routing engine 706 may generally function to route the rule engine's output to the appropriate engine in the data analysis platform 704. For instance, the routing engine 706 may (1) determine where to route the rule engine's output based on the indication of what action should be performed, (2) prepare the output for routing to the destination engine (which may involve functions such as generating an appropriate command to send the designation engine), and then (3) cause the output to be pushed to the destination engine via the messaging layer (e.g., by writing the output to an appropriate message layer topic). In practice, this routing engine 706 may take the form of an event-to-command engine.

For example, if the action is to generate a given notification, then the routing engine 706 may cause the rule engine's output to be pushed via the messaging layer to the notification engine 708, which may then generate the given notification. As another example, if the action is to apply a given data science model to the received data, then the routing engine 706 may cause the rule engine's output to be pushed via the messaging layer to the data science engine 710, which may then run apply the given data science model on the received data. As yet another example, if the action is to push certain received and/or generated data to another platform, then the routing engine 706 may cause the rule engine's output to be pushed via the messaging layer to the data sharing engine 712, which may in turn push the data to the data sharing system 506.

As noted above, the data analysis system 504 may other perform other functions in addition to those illustrated in FIG. 7.

D. Data Sharing of the Asset-Related Information

Figure 8:
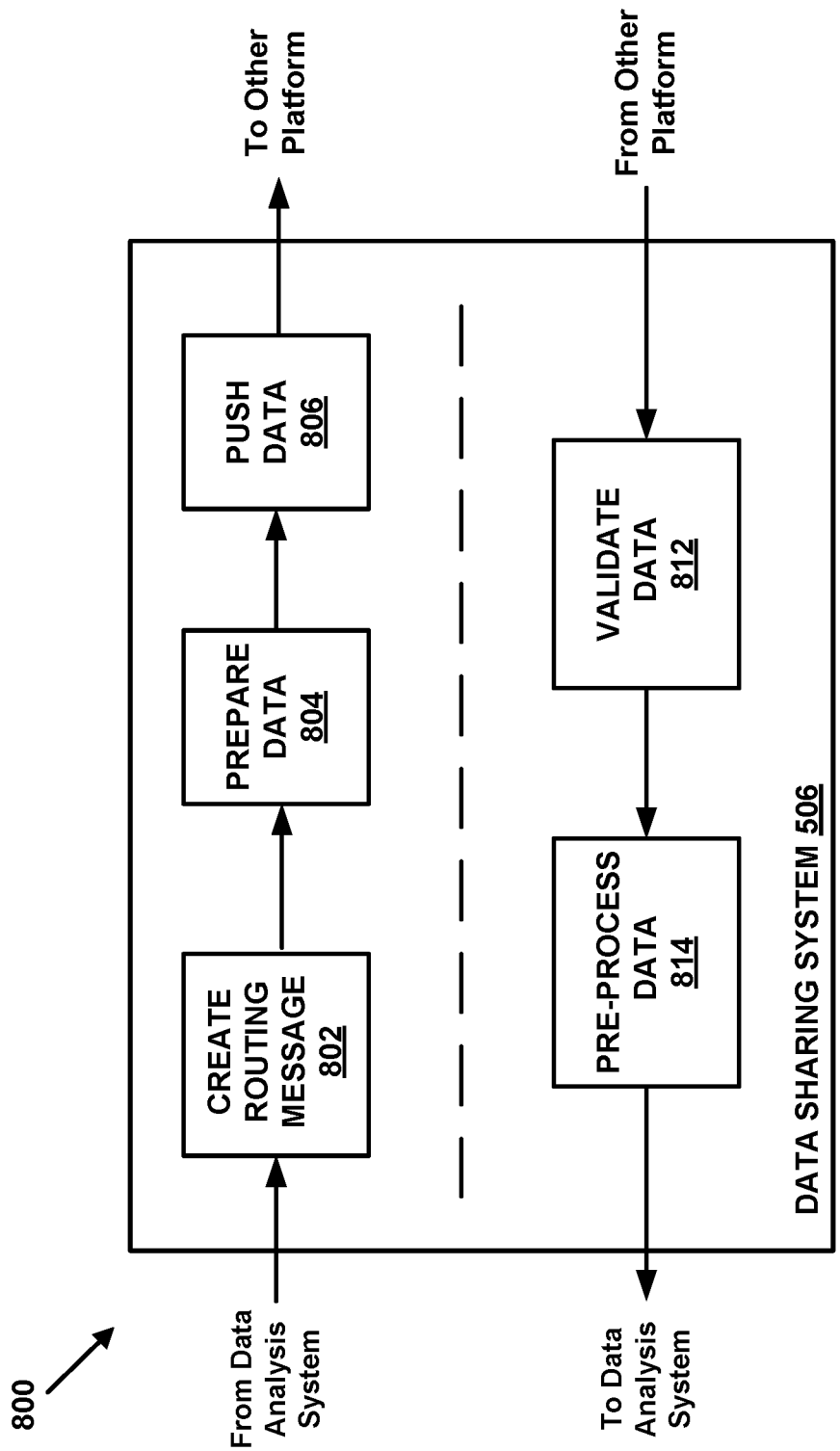
FIG. 8 is a functional block diagram that illustrates example data sharing system functions performed by the example platform.

FIG. 8 is a functional block diagram 800 that illustrates some representative functions that may be carried out by the data sharing system 506 after it receives data from the data analysis system 504. As shown in FIG. 8, the data sharing system 506 may include functions for pushing data to another platform, and these functions may include creating a routing command 802, preparing the data 804, and pushing the data 806. In addition, the data sharing system 506 may also include functions for receiving data from another platform, and these functions may include validating the data 812 and pre-processing the data 814. These functional blocks may enable data sharing system 506 to generally facilitate communication between the example platform 500 and other platforms via the communication network 108.

The create routing message function 802 may serve to generate the message to push to each of the one or more other platforms. In practice, the create routing message function 802 may generate these messages based on the data received from the data sharing engine 712 (which may include the results of the rules engine's determination of what action to take), and each such message may include (1) a command that instructs a given platform as to what action to take and (2) data to use in the performance of this action.

The messages generated by the create routing message function 802 may take various forms. In one embodiment, such a message may comprise a command that instructs another platform to take a CRUD action (e.g., create, read, update, or delete) with respect to certain asset-related data. In this respect, along with the command, the message may include an identification of the asset-related data and perhaps also the contents of the asset-related data that is the subject of the CRUD action (e.g., for create, read, and update actions). This type of routing message may thus enable different platforms in the network configuration to share and synchronize their asset-related data.

In another embodiment, such a message may comprise a command that instructs another platform to implement new logic, such as a new data model, new rules for pre-processing received data, and/or new rules dictating what actions to take based on received data. In this respect, along with the command, the message may include a definition of the new logic. This type of routing message may thus enable certain platforms (e.g., the master platform) to distribute logic to other platforms in the network configuration.

The messages generated by the create routing message function 802 may take other forms as well, including the possibility that such messages may comprise asset-related data without any corresponding commands—in which case the data sharing system 506 may rely on the receiving platform to determine what action to take on the asset-related data.

The prepare data function 804 may generally serve to prepare the message before being sent outside the platform. This preparation function may take various forms. As one example, the preparation function 804 may include formatting the message in accordance with the platform which is to receive the data. As another example, the preparation function 804 may include scrubbing the data and/or cleaning the data before routing the data to the other platform. For instance, the data may have location information, sensitive personal information (e.g., a social security number), or sensitive financial information that should not be released outside of the platform, and this information may be removed from the data. The prepare data function 804 may also take other forms as well.

The push data function 806 may generally serve to push the routing messages to the one or more other platforms via the communication network 108. As part of this process, the push data function 806 may begin by establishing a connection with the one or more other platforms via the communication 108. For instance, as noted above, the data routed to the data sharing system 506 via the sharing engine 712 may specify the one or more other platforms that are to receive the data, and the push data function 806 may use this information to establish a connection with the one or more other platforms. As one possible example, the received data may include IP addresses (or the like) for the one or more other platforms, and the establish connection function 802 may use these IP addresses to establish TCP or HTTP connections with each of the one or more other platforms via the communication network 108. Additionally, the push data function 806 may need to provide authentication information (e.g., user name, password, etc.) for the one or more other platforms in order to establish a connection. Thereafter, the push data function 806 may then push the routing messages to the one or more other platforms over the established connection with each such platform.

As noted above, the data sharing system 506 may also carry out certain functions after it receives routing messages from another platform, such as a validate data function 812 and a preprocess data function 814.

The validate data function 812 may serve to validate routing messages that are received from other platforms. For example, the validate data function 812 may validate the sender of the routing message and/or the contents of the routing message. The preprocess data function 814 may perform one or more pre-processing functions on the receiving routing message, such as data mapping, data de-duplication and/or data merging.

The data sharing system 506 may then provide routing messages received from other platforms to the data intake system 502 (e.g., via an API POST), which may then carry out one or more of the functions described above on the routing messages. For instance, at a minimum, the data intake system 502 may carry out the action identification function 610 on the routing messages to identify what actions should be taken based on the received routing messages and then place the routing messages into a form that serves to notify the data analysis system 504 of the identified actions. In practice, this may involve interpreting a command included in a routing message and then causing the platform 500 to execute this command.

For example, if a routing message includes a command to take a CRUD action with respect to asset-related data, the action identification function 610 may interpret this command and then cause the data analysis system 504 to take the requested CRUD action (e.g., by creating, reading, updating, or deleting certain asset-related data). As another example, if a routing message includes a command to implement new logic, the action identification function 610 may interpret this command and then cause the data intake system 502 and/or the data analysis system 504 to implement the new logic. Other examples are possible as well.

V. Example Flow Diagrams

Figure 9:
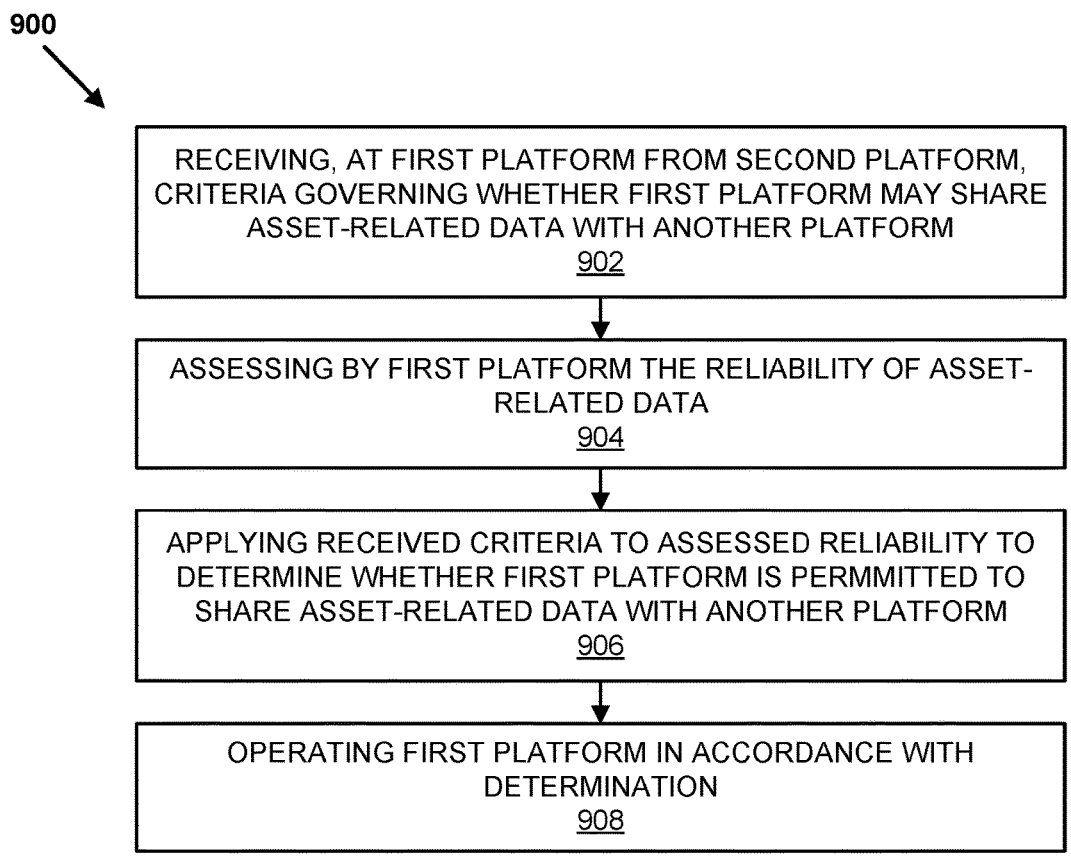
FIG. 9 depicts a flow diagram of an example method for determining whether to share asset-related data with other platforms over a network.

Turning now to FIG. 9, a flow diagram is depicted illustrating an example method 900 for determining whether to share asset-related data in a network of platforms based on criteria received from another platform (e.g., a master or seed platform). For the method 900 and other methods discussed below, the operations illustrated by the block in the flow diagrams may be performed in line with the above discussion. Moreover, one or more operations discussed above may be added to a given flow diagram.

At block 902, the method 900 may involve a first platform in the network configuration 100, such as the owner platform 106, receiving criteria from a second platform, such as the manufacturer platform 102, that governs whether the owner platform 106 is permitted to share asset-related data with other platforms in the system. This criteria may be based on the reliability of asset-related data stored at the first platform. At block 904, the method 900 may involve the first platform assessing the reliability of its stored asset-related data. At block 906, the method 900 may involve the first platform applying the received criteria to the assessed reliability of its stored asset-related data stored and thereby making a determination as to whether the first platform is permitted to share asset-related data with one or more other platforms in the network configuration 100. At block 908, the method 900 may involve the first platform operating in accordance with the determination made at block 906.

Figure 10:
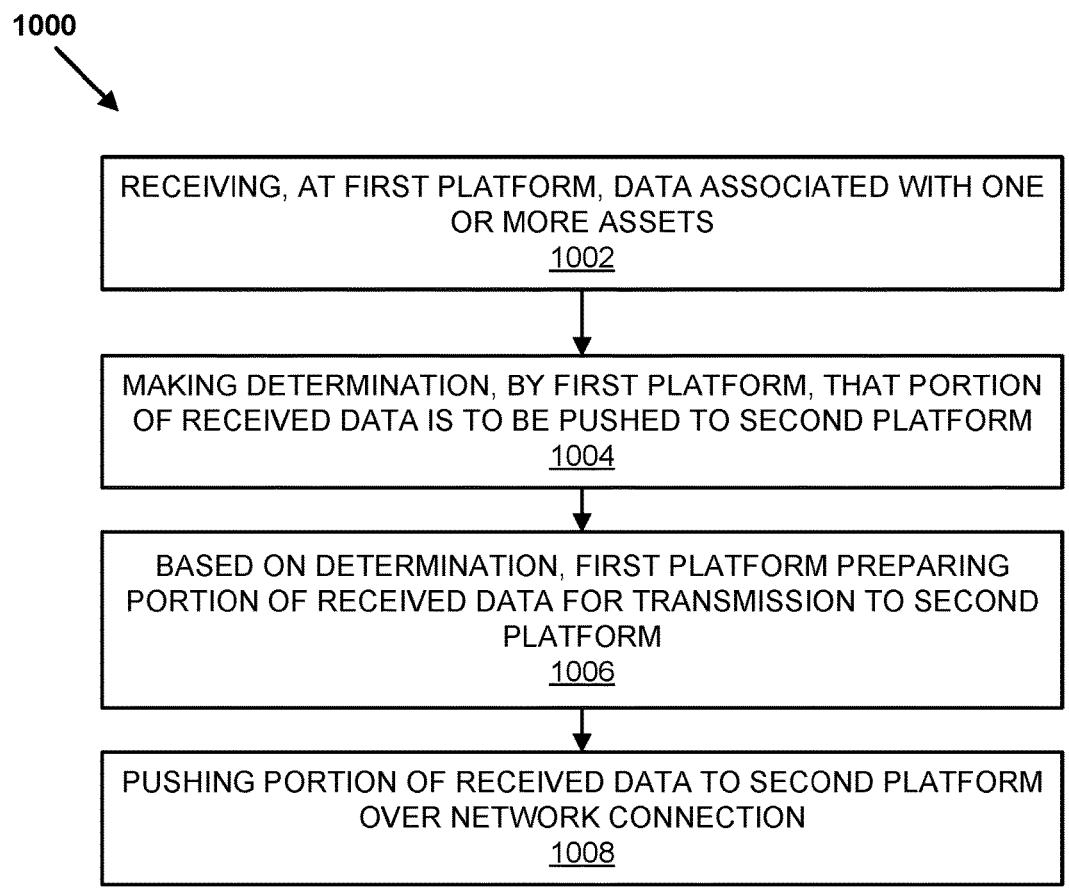
FIG. 10 depicts a flow diagram of an example method for sharing asset-related data with another platform over a network.

FIG. 10 depicts a flow diagram of an example method 1000 for sharing asset-related data with another platform over a network. At block 1002, the method 1000 may involve a first platform in the network configuration 100, such as the owner platform 106, receiving data associated with one or more assets. At block 1004, the method 1000 may involve the first platform making a determination that a given portion of the received data is to be pushed to a second platform in the network configuration 100, such as the manufacturer platform 102. At block 1006, the method 1000 may involve the first platform preparing the given portion of the received data for transmission to the second platform. At block 1008, the method 1000 may involve the first platform pushing the given portion of the received data to the second platform over a network connection.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. In a system comprising a plurality of platforms that are communicatively coupled via a communication network, a computer-implemented method comprising:
   receiving, at a first platform from a second platform that is communicatively coupled to the first platform via the communication network, criteria that governs whether the first platform is permitted to share asset-related data with one or more other platforms in the system, wherein the criteria is based on the reliability of asset-related data stored at a platform, wherein the first and second platforms are each configured to receive, process, and store respective asset-related data, and wherein the first and second platforms are each associated with a different respective organization;
   the first platform assessing the reliability of asset-related data stored at the first platform by considering at least one of (a) how successful the first platform was in mapping given asset-related data stored at the first platform to a data model or (b) which data fields were present in the given asset-related data after data mapping;
   the first platform applying the received criteria to the assessed reliability of asset-related data stored at the first platform and thereby making a determination as to whether the first platform is permitted to share asset-related data with the one or more other platforms; and
   the first platform operating in accordance with the determination.

2. The computer-implemented method of claim 1, wherein assessing the reliability of asset-related data stored at the first platform by considering at least one of (a) how successful the first platform was in mapping the given asset-related data to a data model or (b) which data fields were present in the given asset-related data after data mapping comprises:
   assessing the reliability of asset-related data stored at the first platform by one or both of (a) determining an extent of the given asset-related data that was successfully mapped to a given data model or (b) determining an extent of the given asset-related data that includes a set of preferred data fields after data mapping.

3. The computer-implemented method of claim 1, wherein making a determination as to whether the first platform is permitted to share asset-related data with one or more other platforms in the system comprises making a determination that the first platform is permitted to share asset-related data with the one or more other platforms.

4. The computer-implemented method of claim 3, wherein the first platform operating in accordance with the determination comprises at least one of (a) the first platform beginning to share asset-related data with the one or more other platforms or (b) the first platform notifying the one or more other platforms that the first platform is permitted to share asset-related data.

5. The computer-implemented method of claim 1, wherein making a determination as to whether the first platform is permitted to share asset-related data with one or more other platforms in the system comprises making a determination that the first platform is not permitted to share asset-related data with the one or more other platforms.

6. The computer-implemented method of claim 5, wherein the first platform operating in accordance with the determination comprises:
   the first platform disabling its ability to share asset-related data to the one or more platforms.

7. The computer-implemented method of claim 1, further comprising:
   receiving, at the first platform from the second platform, logic that dictates the manner in which the first platform is to process asset-related data; and
   the first platform operating in accordance with the received logic.

8. The computer-implemented method of claim 7, wherein the logic comprises a data model to be used by the first platform to map incoming asset-related data.

9. The computer-implemented method of claim 7, wherein the logic comprises a data analysis rule to be applied to incoming asset-related data by the first platform.

10. The computer-implemented method of claim 1, wherein the second platform comprises a master platform for the system.

11. The computer-implemented method of claim 1, wherein the given asset-related data comprises asset-related data received from a given data source.

12. A non-transitory computer-readable medium having instructions stored thereon that are executable to cause a first platform to:
   receive, from a second platform that is communicatively coupled to the first platform via a communication network, criteria that governs whether the first platform is permitted to share asset-related data with one or more other platforms that are communicatively coupled to the first platform via the communication network, wherein the criteria is based on the reliability of asset-related data stored at a platform, wherein the first and second platforms are each configured to receive, process, and store respective asset-related data, and wherein the first and second platforms are each associated with a different respective organization;
   assess the reliability of asset-related data stored at the first platform by considering at least one of (a) how successful the first platform was in mapping given asset-related data to a data model or (b) which data fields were present in the given asset-related data after data mapping;

apply the received criteria to the assessed reliability of asset-related data stored at the first platform and thereby make a determination as to whether the first platform is permitted to share asset-related data with the one or more other platforms; and operate in accordance with the determination.

13. The non-transitory computer-readable medium of claim 12, wherein the instructions that are executable to cause the first platform to assess the reliability of asset-related data stored at the first platform by considering at least one of (a) how successful the first platform was in mapping the given asset-related data to a data model or (b) which data fields were present in the given asset-related data after data mapping comprise instructions that are executable to cause the first platform to assess the reliability of asset-related data stored at the first platform by one or both of (a) determining an extent of the given asset-related data that was successfully mapped to a given data model or (b) determining an extent of the given asset-related data that includes a set of preferred data fields after data mapping.

14. The non-transitory computer-readable medium of claim 12, wherein the instructions that are executable to cause the first platform to make the determination as to whether the first platform is permitted to share asset-related data with the one or more other platforms comprise instructions that are executable to cause the first platform to make a determination that the first platform is permitted to share asset-related data with the one or more other platforms.

15. The non-transitory computer-readable medium of claim 14, wherein the instructions that are executable to cause the first platform to operate in accordance with the determination comprise at least one of (a) instructions that are executable to cause the first platform to begin sharing asset-related data with the one or more other platforms or (b) instructions that are executable to cause the first platform to notify the one or more other platforms that the first platform is permitted to share asset-related data.

16. The non-transitory computer-readable medium of claim 14, wherein the instructions that are executable to cause the first platform to make the determination as to whether the first platform is permitted to share asset-related data with the one or more other platforms comprise instructions that are executable to cause the first platform to make a determination that the first platform is not permitted to share asset-related data with the one or more other platforms, and wherein the instructions that are executable to cause the first platform to operate in accordance with the determination comprise instructions that are executable to cause the first platform to disable its ability to share asset-related data to the one or more platforms.

17. The non-transitory computer-readable medium of claim 12, further comprising instructions that are executable to cause the first platform to:

receive, from the second platform, logic that dictates the manner in which the first platform is to process asset-related data; and operate in accordance with the received logic.

18. The non-transitory computer-readable medium of claim 17, wherein the logic comprises one of a data model to be used by the first platform to map incoming asset-related data or a data analysis rule to be applied to incoming asset-related data by the first platform.

19. A first platform comprising:

a network interface configured to facilitate communication with one or more data sources and one or more other platforms via a communication network;

at least one processor;

a non-transitory computer-readable medium; and program instructions stored on the non-transitory computer-readable medium that are executable by the at least one processor to cause the first platform to:

receive, from a second platform that is communicatively coupled to the first platform via the communication network, criteria that governs whether the first platform is permitted to share asset-related data with one or more other platforms that are communicatively coupled to the first platform via the communication network, wherein the criteria is based on the reliability of asset-related data stored at a platform, wherein the first and second platforms are each configured to receive, process, and store respective asset-related data, and wherein the first and second platforms are each associated with a different respective organization;

assess the reliability of asset-related data stored at the first platform by considering at least one of (a) how successful the first platform was in mapping given asset-related data to a data model or (b) which data fields were present in the given asset-related data after data mapping;

apply the received criteria to the assessed reliability of asset-related data stored at the first platform and thereby make a determination as to whether the first platform is permitted to share asset-related data with the one or more other platforms; and operate in accordance with the determination.

20. The non-transitory computer-readable medium of claim 12, wherein the given asset-related data comprises asset-related data received from a given data source.

* * * * *